United States Patent Office 3,126,167
Patented Mar. 24, 1964

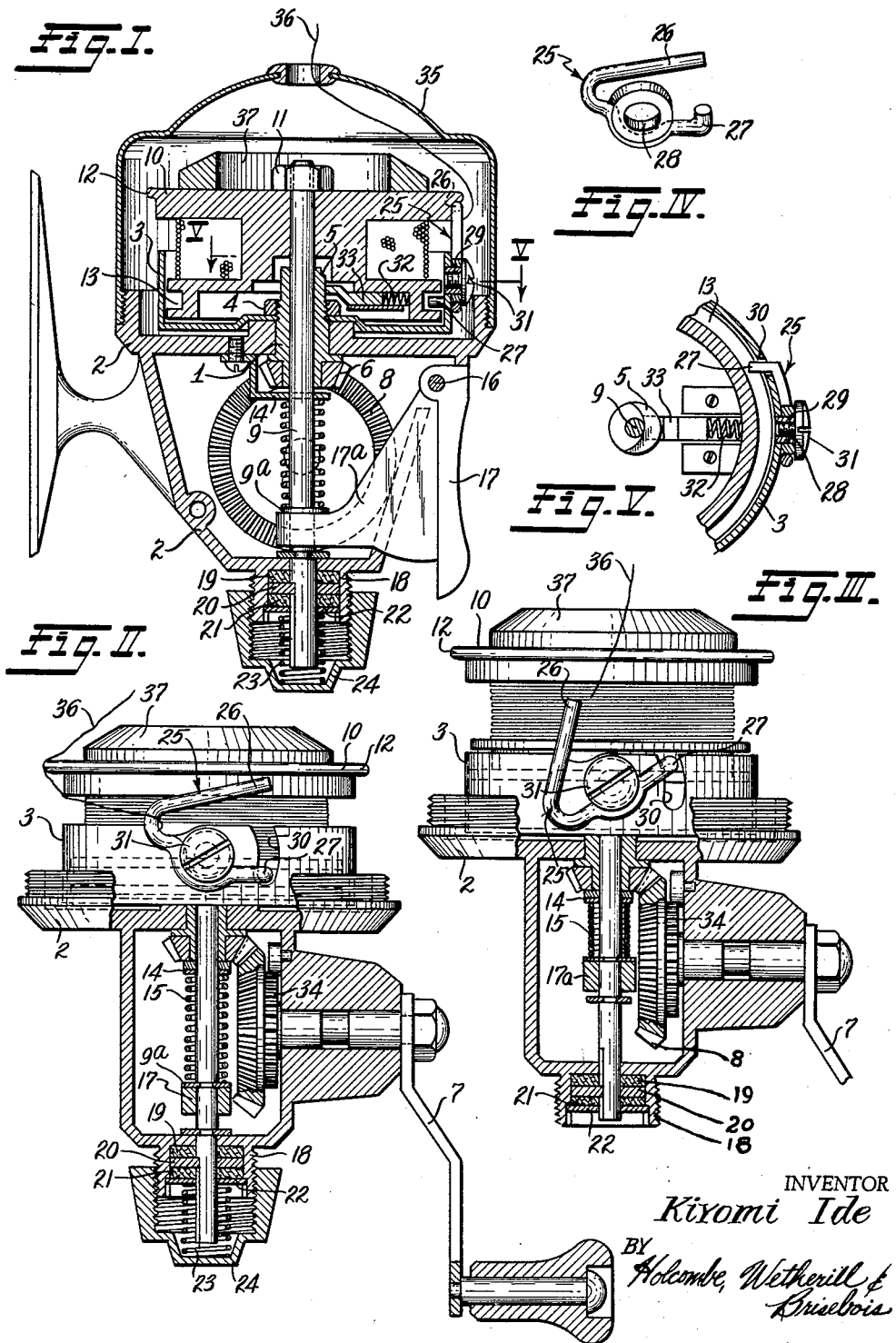

3,126,167
SPINNING REEL
Kiyomi Ide, 22 5-chome, Sanocho, Yokosuka City, Japan
Filed Apr. 16, 1962, Ser. No. 187,666
Claims priority, application Japan Dec. 5, 1961
3 Claims. (Cl. 242—84.2)

My invention relates to a "spinning reel" for use in fishing and featuring a particular line pick-up device, in which the pick-up hook is mounted on a rotating cup and moved by reciprocation of the spool from an active position in which it engages the line to a release position in which it permits the line to be pulled freely off the spool.

A preferred embodiment of my invention will now be described with reference to the accompanying drawings, in which:

FIG. I is an axial section through my new reel;

FIG. II is a view taken from the right of FIG. I, and constituting a side view of the spool and line pick-up, with the cover broken away, combined with an axial section through the handle and gear;

FIG. III is a view similar to FIG. II, but showing the line pick-up hook in its release position, as contrasted with the active position shown in FIG. II;

FIG. IV is a perspective view of the line pick-up hook alone; and

FIG. V is a partial cross-section taken along the line V—V of FIG. I.

Like reference numerals denote like parts throughout the several views.

Referring now to FIG. I, reference numeral 1 denotes a hollow shaft which is rotatably mounted within the casing 2 and carries at one end a cup 3 fixed to the shaft 1 by means of a nut 4. There is an eccentric step 5 at the upper end of the shaft 1 and a small gear wheel 6 at its other end, which meshes with a larger gear 8, driven by the rotatable handle 7. The cup 3 is thus driven by the rotating handle through the hollow shaft 1.

The spool shaft 9 is rotatably and slidably mounted within the hollow shaft 1 and carries at its upper end the spool 10, fixed thereto by means of a nut 11. The spool 10 is detachable, but moves with the spool shaft. The spool is provided with a flange 12 at one end, and a circumferential groove 13 at the other. The spool shaft 9 is biassed away from the cover 35 by a spring 15 which acts between the stop 14 carried by the casing 2 and flange 9α fixed to the shaft 9, which rests on a fork in the arm 17a of the grip 17, which swings about the pin 16 carried by the casing 2.

The lower end of the shaft 9 projects into the box 18 which projects from the casing 2. Within this box the shaft end projects through a felt packing 19, a washer 20 slidably keyed to the shaft 9 so as to return therewith, another felt packing 21, and a keeper washer 22 seated in the end of the box 18. The internally screw threaded knob 24 exerts pressure on the keeper washer 22 through the spring 23 and thus provides frictional resistance to the rotation of the shaft 9 by squeezing the washer 20 between the felt packings 19 and 21.

The line pick-up 25 shown in FIG. IV comprises a long hook 26 at one end, which is made of steel wire, a shorter hook 27 at the other end, and a central hole 28 which receives a pin 29 which projects radially from the cup 3. A screw 31 holds the pick-up hook on the pin. An arcuate groove 30 in the peripheral wall of the cup 3 receives the shorter hook 27, which projects therethrough into the circumferential groove 13 in the spool. The longer hook 26 abuts the flange 12 of the spool, as shown in FIGS. I and II. A radially slidable pin 33 is carried by the lower part of the spool and biased toward the hollow shaft 1 by a spring 32. The reel is also provided with a ratchet wheel 34 for preventing reverse rotation of the cup 3, a cover 35, a fishing line 36, and a line snubber 37.

When the reel is in use, if the operating shaft 9 is pushed upward against the resistance of spring 15 by squeezing the gripping handle 17 so that the fork 17a lifts up the flange 9a fixed to the shaft 9, the spool 10 fixed to said shaft will rise with it into the space between the line snubber 37 and cover 35.

The pin 33 carried by the spool 10 will also rise, and when it passes the eccentric step 5 on the hollow shaft 1, the pin will be moved by the spring 32 toward the shaft axis. In the meantime, the upward movement of the spool will raise the short hook 27, on the line pick-up 25, since the end of this short hook is seated in the groove 13. This has the effect of lowering the longer hook 26 on the opposite end of the line pick-up.

When the grip 17 is released the spool will be biased downward by the spring 15, but since the pin 33 will encounter the eccentric step 5, the spool will remain up and the line pick-up in its release position, as shown in FIG. III. The line will accordingly run off freely if pulled upon.

In order to reel in the line, the rotating handle 7 is turned to rotate the hollow shaft 1 while step 5 cams the pin 33 outwardly until the side of the hollow shaft carrying the eccentric step is turned away from the pin 33, thus permitting the spring 15 to return the spool 10 and shaft 9 to their lower position. This automatically swings the longer end 26 of the line pick-up into its operative (FIG. II) position, in which it abuts the flange 12 on the spool. The rotation of handle 7 will also rotate the cup 3 fixed to the hollow shaft 1, and the line pick-up attached thereto, so that the hook 26 will catch the line 36, and its rotation will wind the line up on the spool.

Backward rotation of the hollow shaft 1, in the event of tension on the line due to a struggling fish, for instance is prevented by pawl means (not numbered) engaging with ratchet wheel 34. If the pull on the line becomes sufficient to overcome the frictional force of the felt packings 19, 21 on the washer 20 keyed to the shaft 9, then the shaft 9, which is ordinarily prevented from rotating by these packings will return within the shaft 1, carrying the spool with it, so as to let the line reel off, and prevent its snapping under such excessive strain.

To sum up, the line pick-up is moved between its active and release positions by squeezing and releasing the grip 17 to reciprocate the shaft 9 and spool 10. Rotation of the cup 3 with the hollow shaft 1 reels the line in, and reverse rotation of the spool 10 and shaft 9 against the frictional resistance of the felt washers 19 and 21 permits the line to unwind in case of excessive tension, even when the line pick-up is in its active position.

What is claimed is:

1. A fishing reel comprising a support, a hollow shaft rotatably mounted in said support, a spool shaft rotatably and slidably mounted within said hollow shaft, a spool fixed to said spool shaft, means for sliding said spool shaft axially within said hollow shaft, means for rotating said hollow shaft independently of said spool shaft, a line pick-up pivotally carried by said hollow shaft for swinging movement across the line carrying surface of said spool between a line engaging and a line release position, and cooperating means carried by said line pick-up and spool for swinging said line pick-up between said two positions as said spool shaft moves axially of said hollow shaft, said cooperating means comprising a circumferential groove on said spool and a hook on said line pick-up which projects radially inward into said groove.

2. A fishing reel as claimed in claim 1 comprising resilient means biasing said spool toward the position in which it holds said line pick-up in line engaging position and said means for sliding said spool shaft is a handle pivotally mounted on said support and carrying a fork which engages a flange on said spool shaft.

3. A fishing reel comprising a support, a hollow shaft rotatably mounted in said support, a spool shaft rotatably and slidably mounted within said hollow shaft, a spool fixed to said spool shaft and provided with an axial recess positioned to receive one end of said hollow shaft, means for sliding said spool shaft axially between upper and lower positions in the lower of which said recess receives a longer length of said hollow shaft than in the upper, means for rotating said hollow shaft independently of said spool shaft, an inwardly biased pin carried by said spool and projecting into said recess, a cammed peripheral abutment on said hollow shaft positioned to engage said pin and thereby prevent said spool shaft from sliding axially from said upper to said lower position when said shafts are in one relative angular position, but permit such sliding when said shafts are in another relative angular position, a line pick-up pivotally carried by said hollow shaft for swinging movement across the line carrying surface of said spool between a line engaging and a line release position, and cooperating means carried by said line pick-up and spool for swinging said line pick-up between said two positions as said spool shaft moves axially of said hollow shaft.

References Cited in the file of this patent

UNITED STATES PATENTS

| | | |
|---|---|---|
| 2,602,603 | Blissit | July 8, 1952 |
| 2,711,292 | Taggart et al. | June 21, 1955 |
| 2,862,679 | Denison et al. | Dec. 2, 1958 |
| 2,863,617 | Chapin et al. | Dec. 9, 1958 |
| 2,879,954 | Small | Mar. 31, 1959 |
| 2,991,957 | Hull | July 11, 1961 |
| 3,052,424 | Skraban | Sept. 4, 1962 |

FOREIGN PATENTS

| | | |
|---|---|---|
| 521,222 | Italy | Mar. 26, 1955 |